(12) United States Patent
Hermatschweiler et al.

(10) Patent No.: US 8,202,437 B2
(45) Date of Patent: Jun. 19, 2012

(54) METHOD FOR PRODUCING A PHOTONIC CRYSTAL

(75) Inventors: Martin Hermatschweiler, Karlsruhe (DE); Georg von Freymann, Karlsruhe (DE); Martin Wegener, Karlsruhe (DE); Geoffrey Alan Ozin, Toronto (CA)

(73) Assignees: Forschungszentrum Karlsruhe GmbH, Karlsruhe (DE); Universitat Karlsruhe, Karlsruhe (DE)

( * ) Notice: Subject to any disclaimer, the term of this patent is extended or adjusted under 35 U.S.C. 154(b) by 739 days.

(21) Appl. No.: 12/227,559

(22) PCT Filed: May 16, 2007

(86) PCT No.: PCT/EP2007/054766
§ 371 (c)(1),
(2), (4) Date: Feb. 9, 2009

(87) PCT Pub. No.: WO2007/137944
PCT Pub. Date: Dec. 6, 2007

(65) Prior Publication Data
US 2009/0166325 A1    Jul. 2, 2009

(30) Foreign Application Priority Data
May 30, 2006   (DE) .......................... 10 2006 025 100

(51) Int. Cl.
*B29D 11/00*    (2006.01)
(52) U.S. Cl. ............................. 216/24; 216/2
(58) Field of Classification Search .......... 216/24, 216/2; 438/689
See application file for complete search history.

(56) References Cited

U.S. PATENT DOCUMENTS
2003/0106487 A1    6/2003   Huang

2004/0062700 A1    4/2004   Miguez et al.
2004/0062790 A1    4/2004   Constantine et al.
2004/0172973 A1    9/2004   Chen et al.

FOREIGN PATENT DOCUMENTS
WO    2004/063432    7/2004
WO    2004/099835    11/2004

OTHER PUBLICATIONS

N. Tetreault, et al: "New Route to Three-Dimensional Photonic Bandgap . . . " BD. 18, Oct. 11, 2005, pp. 457-460, XP002449245.
G.M. Gratson et al: "Direct-Write Assembly of Three-Dimensional Photonic Crystals . . . ", BD. 18, Jan. 24, 2006, pp. 461-465, XP002449246.
E. Yablonovitch, Phys. Rev. Lett., vol. 58, p. 2059-2062, 1987.
K.-M. Ho, C.T. Chan, and C.M. Soukoulis, Phys. Rev. Lett., vol. 65, p. 3152-3155, 1990.
K.-M. Ho, C.T. Chan, C.M. Soukoulis, R. Biswas, and M. Sigalas, Solid State Comm., vol. 89, p. 413-416, 1994.
E. Özbay et al, Phys. Rev. B, vol. 50, p. 1945-1948, 1994.

(Continued)

*Primary Examiner* — Roberts Culbert
(74) *Attorney, Agent, or Firm* — Lucas & Mercanti, LLP; Klaus P. Stoffel

(57) ABSTRACT

The invention relates to a process for producing a photonic crystal which consists of a material of high refractive index, comprising the following process steps:
a) providing a polymer structure with crosslinked air pores, whose surface has empty interstitial sites,
b) applying a homogeneous, isotropic thin coating material to the surface of the polymer structure,
c) introducing a high-index material,
d) opening up a route to the polymer or to the coating material applied in step b),
e) removing the layer applied in step b),
f) removing the polymeric structure.

19 Claims, 7 Drawing Sheets

OTHER PUBLICATIONS

Figure 1:
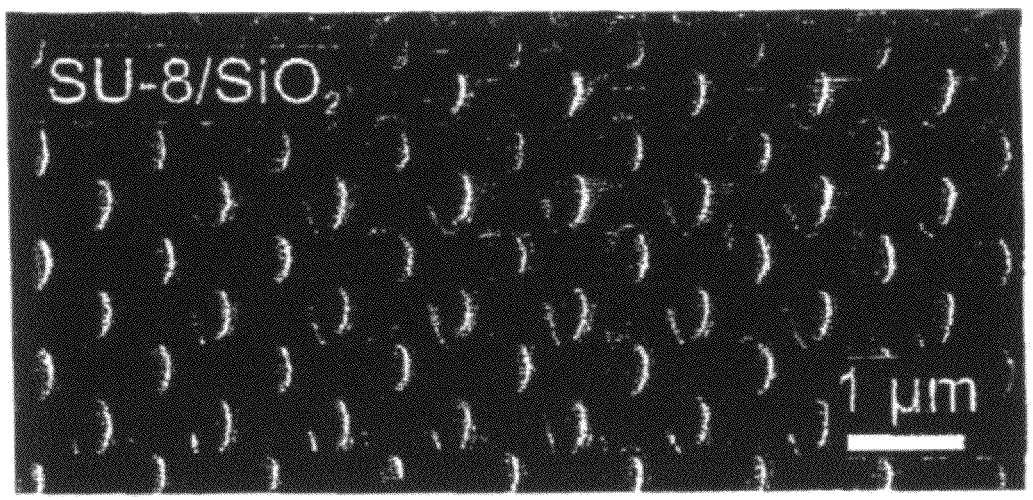
Figure 2:
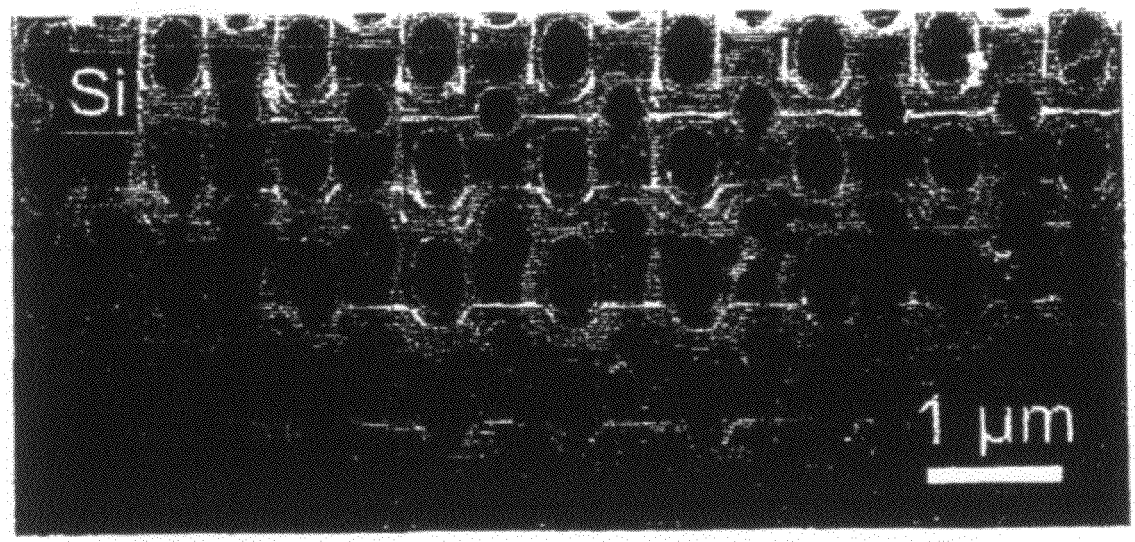

S.Y. Lin et al., Nature, vol. 394, p. 251-253, 1998.
S. Noda et al., Science, vol. 289, p. 604-606, 2000.
K. Aoki et al., Nature Materials, vol. 2, p. 117-121, 2003.
M. Campbell et al., Nature, vol. 404, p. 53-56, 2000.
Y.V. Miklyaev et al., Appl. Phys. Lett., vol. 82, p. 1284-1286, 2003.
S. Kawata, H.-B. Sun, T. Tanaka and K. Takada, Nature, vol. 412, p. 697-698, 2001.
Infiltration and Inversion of Holographically Defined Polymer Photonic Crystal Templates by Atomic Layer Deposition Adv. Mat., DOI: 10.1002/adma.200502287, 2006.
Gregory M. Gratson et al. Advanced Materials 18, pp. 461-465, 2006.
N. Tetrèault et al., Advanced Materials, 18, pp. 457-460, 2006.

METHOD FOR PRODUCING A PHOTONIC CRYSTAL

The invention relates to a process for producing a three-dimensional photonic crystal which consists of a material with a high refractive index.

Photonic crystals, which date back to E. Yablonovitch, Phys. Rev. Lett., Volume 58, page 2059-2062, 1987, and S. John, ibid., page 2486-2489, 1987, are periodically structured dielectric materials which constitute the optical analog of semiconductor crystals and thus enable the production of integrated photonic circuits.

For face-centered cubic structures, according to K.-M. Ho, C. T. Chan, and C. M. Soukoulis, Phys. Rev. Lett., Volume 65, page 3152-3155, 1990, photonic crystals may theoretically have up to 25% relative to the central frequency when the high-index material used is silicon.

Layer structures in particular are, according to K.-M. Ho, C. T. Chan, C. M. Soukoulis, R. Biswas, and M. Sigalas, Solid State Comm., Volume 89, page 413-416, 1994, and E. Ozbay et al, Phys. Rev. B, Volume 50, page 1945-1948, 1994, obtainable via microfabrication processes. Recently, S. Y. Lin et al., Nature, Volume 394, page 251-253, 1998, S. Noda et al., Science, Volume 289, page 604-606, 2000, and K. Aoki et al., Nature Materials, Volume 2, page 117-121, 2003, have produced photonic crystals for infrared frequencies by combining planar semiconductor microstructuring processes for individual layers with sophisticated alignment and stacking processes in order to configure a three-dimensional photonic crystal from the layers.

This allows incorporation of functional elements by controlled changes in individual layers. However, stacking has to date only been successful for a few layers, which leads to high coupling between the conduction modes in the photonic crystal and the loss modes in the surrounding material, as a result of which the performance of the functional elements is restricted.

Therefore, M. Campbell et al., Nature, Volume 404, page 53-56, 2000, and Y. V. Miklyaev et al., Appl. Phys. Lett., Volume 82, page 1284-1286, 2003, moved to the production of extended three-dimensional photonic crystals of high quality in photoresist layers by means of holographic lithography. Here, the thickness of the photonic crystals is in principle restricted only by the thickness of the photoresist layer and its absorption. Holographic lithography enables the provision of defect-free layers with a thickness of a few 10s of unit cells with an expansion of a few $mm^2$, this process having great flexibility with regard to the contents of the unit cell. However, this multibeam interference process only allows the production of strictly periodic structures.

A further process for producing extended three-dimensional photonic crystals is phase mask lithography. Here too, the process is restricted to strictly periodic structures.

Therefore, a second complementary process is required to write functional elements, for example waveguides or microcavity structures, into the interior of a photonic crystal which has been produced by holographic lithography. Particularly suitable for this purpose is the so-called direct laser writing (DLW) by multiphoton polymerization in the photosensitive material, known from S. Kawata, H.-B. Sun, T. Tanaka and K. Takada, Nature, Volume 412, page 697-698, 2001.

In this method, a photoresist is exposed by means of a laser whose frequency is below the single-photon polymerization threshold of the photoresist. When this laser is focused onto the interior of the photoresist, the light intensity within a small volume at the focal point can exceed the threshold for multiphoton polymerization. Size and shape of these so-called voxels depend upon the isointensity surfaces, i.e. isophotes, the microscope lens used and the illumination threshold for multiphoton polymerization in the photosensitive material. Using this process, S. Kawata et al. have to date been able to produce voxels with a size down to 120 nm with illumination at 780 nm.

In conjunction with holographic lithography, direct laser writing offers a rapid and precise way of providing functional elements in photonic crystals. However, the introduction of materials with high refractive index into such structures is in most cases not possible thereby, since high temperatures for the coating and high chemical reactivity of the precursor substances for known coating processes, for example chemical vapor deposition (CVD), destroy the existing structures. For instance, the infiltration and direct inversion of polymeric photonic crystals with $TiO_2$ via an atomic layer deposition (ALD) process at temperatures of 100° C. is described by (Infiltration and Inversion of Holographically Defined Polymer Photonic Crystal Templates by Atomic Layer Deposition Adv. Mat., DOI: 10.1002/adma.200502287).

Gregory M. Gratson et al. Advanced Materials 18, pages 461-465, 2006, disclose the coating of a polymeric photonic crystal with $SiO_2$. Thereafter, the polymer is removed completely, before Si is deposited on the thermally stable $SiO_2$ shell. This process is not an infiltration process, since Si grows both on the outer and on the inner surfaces of the hollow $SiO_2$ tube. This process does not afford an inverse structure. Equally, it would be impossible to completely infiltrate the structure, since the end result would otherwise be a solid material Si layer into which a fragile $SiO_2$ hollow framework would be embedded.

N. Tetrèault et al., Advanced Materials, 18, pages 457-460, 2006, disclose avoiding the problem of infiltrating a polymeric photonic crystal by first inverting the polymer structure completely into an $SiO_2$ structure. To this end, the photonic crystal is first infiltrated fully with $SiO_2$ and then the polymer is removed. However, the production of inverse structures with high refractive index is not possible by this process. Instead, only direct copies of the polymeric photonic crystal are produced.

US 2003/0106487 A1 discloses, proceeding from a polymer structure with spherical spaces, infiltrating them completely with a second material. This step is then followed by removal, thinning or modification of the polymer structure. For example, the polymer structure is made nanoporous. Thereafter, a third material can be introduced into the existing voids. Finally, the second material can also be removed, such that the original polymer structure is replicated by the third material. However, these process steps are unsuitable for bringing about the result of an inversion of a polymer structure with a high-index material. In other words, the process according to US 2003/0106487 A1 cannot achieve an inverse structure. WO 2004/063432 A1 describes a process which proceeds from colloidal crystals. The surface of the colloids is sheathed with an oxide. The colloids are then removed, such that the oxide shell is maintained as an inverse imprint of the colloidal crystal. Subsequently, the high-index material is deposited on the inside of the inverse imprint. Finally, the oxide shell is removed. However, this process is unsatisfactory because it means a considerable investment of time.

Further measures are known from US 2004/0062790 A1 and WO 2004/099835 A1. However, these do not work satisfactorily either, in particular as far as the problem of inversion is concerned. In particular, it is problematic to perform an inversion of a photonic crystal consisting of a polymer into a photonic crystal with a high refractive index.

The problem arises from the fact that common processes for depositing high-index materials (for example gas phase deposition CVD) require temperatures which are incompatible with the polymeric starting material. The polymer would be raised above its glass transition temperature and hence melt, evaporate or even combust.

Proceeding from this, it is an object of the present invention to propose a process for producing a photonic crystal which consists of a material of high refractive index, which does not have the disadvantages and restrictions mentioned.

This object is achieved by a process for producing a photonic crystal which consists of a material of high refractive index or metal, comprising the following process steps:
a) providing a polymer structure with crosslinked air pores, whose surface has empty interstitial sites,
b) applying a homogeneous, isotropic, thin coating material to the surface of the polymer structure,
c) introducing a high-index material,
d) opening up a route to the polymer or to the coating material applied in step b),
e) removing the layer applied in step b),
f) removing the polymeric structure.

The sequence of steps e) and f) can be switched.

The present invention is situated in the field of nanotechnology in the areas of optics and semiconductor technology. Firstly, common processes such as chemical gas phase deposition (CVD), atomic layer deposition (ALD) and reactive ion etching (RIE) are used in semiconductor technology. Secondly, to produce the polymeric photonic crystals, direct laser writing, which is known from optics, is used.

The process according to the invention constitutes a single inversion process, in which application of an auxiliary layer to the originally polymeric photonic crystal enables the infiltration of this sheathed polymer of high refractive index, which generally requires high deposition temperatures. After removal of the polymer and of the auxiliary layer by suitable processes, the end product obtained is a three-dimensional photonic crystal of high refractive index. This then possesses the inverse structure of the sheathed starting polymer.

According to the invention, for the high-index material, the shaping polymer is coated with a hard shell, for example of $SiO_2$, in order to become compatible for the infiltration with the high-index material. The polymer need not be removed beforehand. This considerably shortens the process for converting the polymeric photonic crystal to a photonic crystal consisting of a material of high refractive index. Less $SiO_2$ is required for partial infiltration than in the process according to N. Tetreault et al., Advanced Materials, 18, pages 457-460, 2006. The process thus saves time compared to the prior art. Furthermore, no reactive ion etching is needed after the step for partial infiltration with the homogeneous, isotropic, thin coating material, for example $SiO_2$.

The inventive process for converting the polymeric photonic crystal to a photonic crystal consisting of a material of high refractive index accordingly possesses the advantage of time and material savings. In addition, the process has the advantage that inverse structures of the shaping polymer structure are replicated in a high-index material. This allows greater photonic band gaps to be achieved. Compared to the process of N. Tetreault et al., Advanced Materials 18, p. 457-460 (2006), this process additionally has the advantage that no further substrate change is needed. The sample is processed on one substrate from the template up to the inverse structure consisting of a high-index material.

The starting point of the process according to the invention is a three-dimensional photonic crystal which is provided in process step a) and consists of a polymer. To this end, according to the known prior art, a polymer or a polymerizable monomer is preferably applied by means of spin-coating to a first substrate composed of glass, silicon or a polymer. Other substrates and/or the application of the polymer or polymeric monomer to the substrates mentioned, said substrates, however, being coated with adhesion promoters or, for example, thin, HF-resistant materials (currently in use for the inversion), are also possible in principle. Thus, for example, the glass substrate would not be attacked in the case of use of HF.

Subsequently, a polymeric photonic crystal with the desired crystal structure is produced from the polymer, preferably by means of holographic lithography, phase mask lithography or direct laser writing, or a combination of the two processes. Such a photonic crystal possesses a surface by which a lattice with empty interstitial sites is defined. The pore sizes are preferably from 5 nm to 10 μm.

The polymeric photonic crystal is first provided with an isotropic, thin coating. This consists of a material which is thermally stable and/or chemically resistant to the subsequent infiltration. On completion of the coating, the polymer is completely enclosed by the isotropic, thin coating. The resulting structure still possesses fully networked air pores, i.e. is only partially infiltrated. The coating applied makes the polymer structure compatible with the otherwise incompatible subsequent infiltration step. Incompatibilities can be caused, for example, by thermal instability, lack of chemical resistance and poor growth on the surface of the polymer. At the same time, the first coating is compatible with the polymer.

According to the invention, for the isotropic, thin coating, oxides such as $Al_2O_3$, $MgO$, $TiO_2$, $ZrO_2$, $HfO_2$ and $SiO_2$ can be used. In addition, the layer of this kind used may also comprise nitrides such as BN, TiN, $Si_3N_4$m $C_4$, AlN, carbides, and nonstoichiometric compounds composed of metals and oxides, for example $ZnO_{0.99}$, $WO_{3-x}$, $TiO_{2-x}$, and metals as such, for example Ni, Co, Mo, Cr, W.

In a preferred embodiment, silicon dioxide ($SiO_2$) is applied to the polymeric photonic crystal. This can be achieved, for example, by wetting the polymer surface with water ($H_2O$) and then reacting the thin water layer with silicon tetrachloride ($SiCl_4$) to give amorphous $SiO_2$ with release of the gaseous hydrochloric acid (HCl) by-product.

On completion of this process step, the polymeric photonic crystal is provided with a solid shell of the materials mentioned, preferably with a solid shell of amorphous $SiO_2$. This layer is compatible with the process of chemical gas phase deposition (CVD) for infiltration of the structure with a high-index material, which preferably consists of silicon. The reasons for the compatibility are:
1. The thermal stability, i.e. the glass transition temperature of $SiO_2$ is not exceeded during the CVD process. The hard shell thus remains dimensionally stable and additionally prevents the deformation of the enclosed polymer.
2. The chemical compatibility, i.e. the silicon does not grow homogeneously on every substrate. It has to adsorb and desorb the precursor material on the surface. In the variant preferred in accordance with the invention, homogeneous, isotropic growth of amorphous, hydrogenized Si (a-Si: H) takes place on the surface of the amorphous $SiO_2$.

The three-dimensional polymeric photonic crystal preferably sheathed with $SiO_2$ is infiltrated with a material of high refractive index. For this purpose, useful materials are all high-index materials known to those skilled in the art, for example including metals. For example, metallic photonic crystals have suitable properties. The materials of high refractive index used are preferably the semiconductors silicon, also doped with various n- or p-dopants, germanium or an $Si_xGe_{1-x}$ alloy. The silicon itself may be amorphous, nanocrystalline, polycrystalline or monocrystalline, hydrogenated nanocrystalline silicon (nc-Si:H) being a particularly preferred material. In addition, II-V, II-VI, I-VII, IV-VI semiconductors including their n- or p-doped variants, or metals of high refractive index, for example silver (Ag), gold (Au), tungsten (W), iridium (Ir) or tantalum (Ta), are equally suitable.

Preferably in accordance with the invention, the infiltration process used is deposition from the gas phase (CVD=Chemical Vapor Deposition). The gaseous starting material used may be a precursor substance. In the case of deposition of Si, for example $SiH_4$ or $Si_2H_6$ is a suitable precursor. The photonic crystal is heated for this purpose. For this purpose, the crystal may be placed on a resistance-heated heating element in a cold wall reactor.

The heating elements used are heated slowly. Preference is also given to heating to a temperature of from 100 to 800° C., preferably from 200 to 800° C. The operating pressure is from 0.001 mbar up to several 100 mbar, preferably 1-50 mbar.

Owing to the three-dimensional networking of the pores, the precursor can settle on all free surfaces of the photonic crystal and silicon can be deposited. At a deposition rate of, for example, from approx. 5 to 7 nm per minute (at 470° C., 5 mbar, 1 sccm of $Si_2H_6$), the CVD system can be operated until the photonic crystal has been fully infiltrated. Owing to spatially varying diameters of the access channels, small voids may remain, since they are cut off by the precursor gas from further inflow at the time of "full infiltration".

In order to achieve a maximum refractive index contrast, the polymeric starting material and the auxiliary material, for example $SiO_2$, must be removed from the structure. Since these two materials, however, are fully sheathed, with Si in the process preferred in accordance with the invention, chemical or thermal removal is impossible. Consequently, especially in the case of full infiltration with Si, a route to the homogeneous, isotropic, thin layer or up to the shaping polymer is opened up, preferably by means of reactive ion etching (RIE). The etching gases used may, for example, be chlorides, fluorides and also additions of $O_2$—Wet chemical etching and isotropic plasma etching are also alternatives.

In the case of coating with amorphous $SiO_2$, this coating can be removed from the structure preferably by wet chemical etching, for example by means of 1% aqueous hydrofluoric acid. This does not attack the polymer or the Si. Apart from hydrofluoric acid, it is also possible, for example, to use strong alkalies such as concentrated aqueous KOH for oxides. In the case of the nitrides and metals, nitric acid, for example, is a suitable acid to remove them. When, instead of $SiO_2$, other oxides, for example $Al_2O_3$, MgO, $TiO_2$, $ZrO_2$, $HfO_2$, are used, it is possible, for example, to use hydrochloric acid.

The acids act for from about a few seconds up to several hours. In the case of coating with amorphous $SiO_2$, the action time is about 1-30 minutes.

The expiry of the action time is followed by rinsing. Double distilled water is preferably used for this purpose. This is followed by a short drying process and another etching step. The duration of the further etching step is 1-30 minutes.

In the case of use of $SiO_2$, the etching time is likewise 1-30 minutes.

The shaping polymer is subsequently removed from the resulting polymer composite structure, preferably polymer/Si composite structure. Preference is given here to performing a thermal decomposition. In other words, for example, the polymer/composite structure is introduced into an oven heated to 200-800° C., preferably 350-600° C., to remove the polymer. The sample is preferably heated for several hours, more preferably for 10 seconds.

Apart from thermal decomposition, other suitable processes for removing the shaping polymer are also useful. For example, plasma processes can be used (for example air or oxygen plasma). Wet chemical processes are equally suitable.

The end product formed is a three-dimensional photonic crystal composed of high-index material (preferably Si), i.e. preferably with a refractive index of n>2.3. This has the inverse structure of the sheathed three-dimensional polymeric photonic crystal. The removal of the shaping polymer therefore brings about the formation of the desired three-dimensional photonic crystal composed of material of high refractive index, whose structure is the inverse of the polymer sheathed with the auxiliary layer after process step b). The crystal lattice of the photonic crystal thus obtained may, for example, have a face-centered cubic (fcc), a simple cubic (sc), a slanted pore, a diamond or a square spiral structure.

The process according to the invention enables the production of three-dimensional photonic crystals of high dielectric contrast. These may have all structures and topologies which can be produced by means of holographic lithography, phase mask lithography, direct laser writing, or a combination of the two processes. This allows functional structures to be produced in three-dimensional photonic crystals without further process steps. The process according to the invention provided enables the production of three-dimensional photonic crystals which can form full photonic band gaps in the case of suitable structures.

The invention is illustrated below by working examples and the figures. The figures show:

FIG. 1:

A section through an $SiO_2$-sheathed polymeric photonic crystal, carried out with a focused ion beam (FIB) is shown. The sample was heated up under the same conditions which were used for the infiltration with Si. A ramp from room temperature to 470° C. was run within three hours. This temperature was maintained for two hours until a ramp back to room temperature was run within two hours. It can be seen that the polymer is still enclosed in the solid $SiO_2$ shell and the shape has been preserved.

FIG. 2:

A section with an FIB instrument through a silicon single-inverted photonic crystal is shown. The inverse structure of the shape shown in FIG. 1 is obtained.

Figure 3:
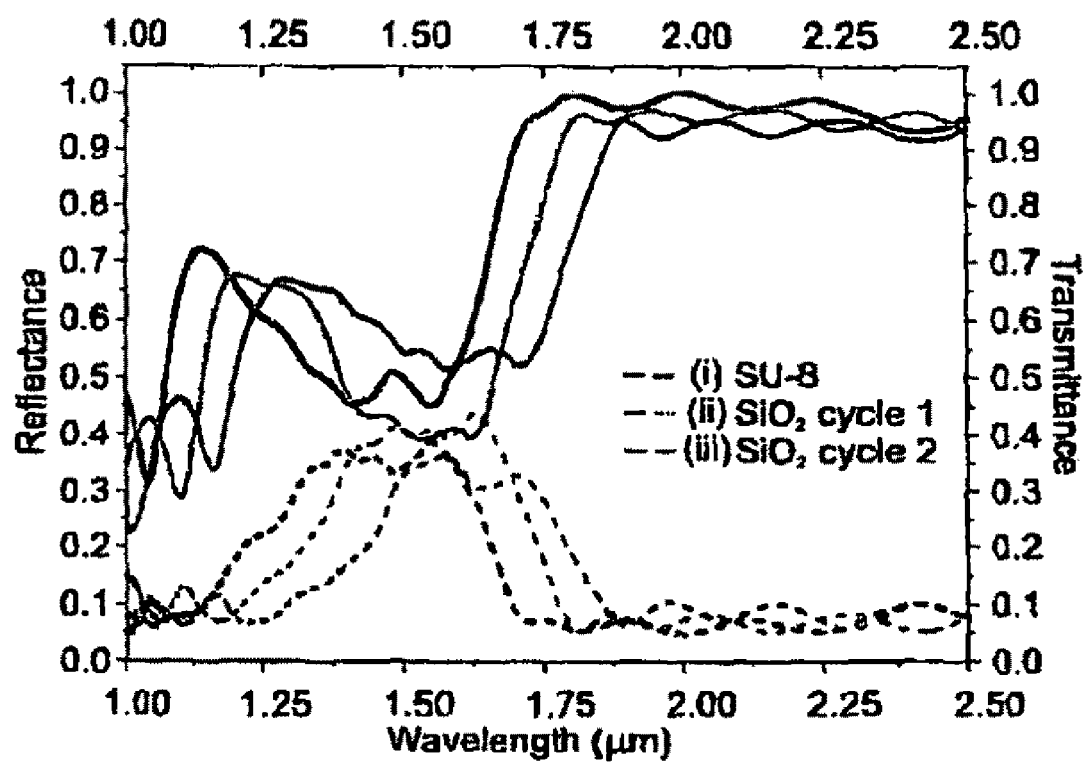
Figure 4:
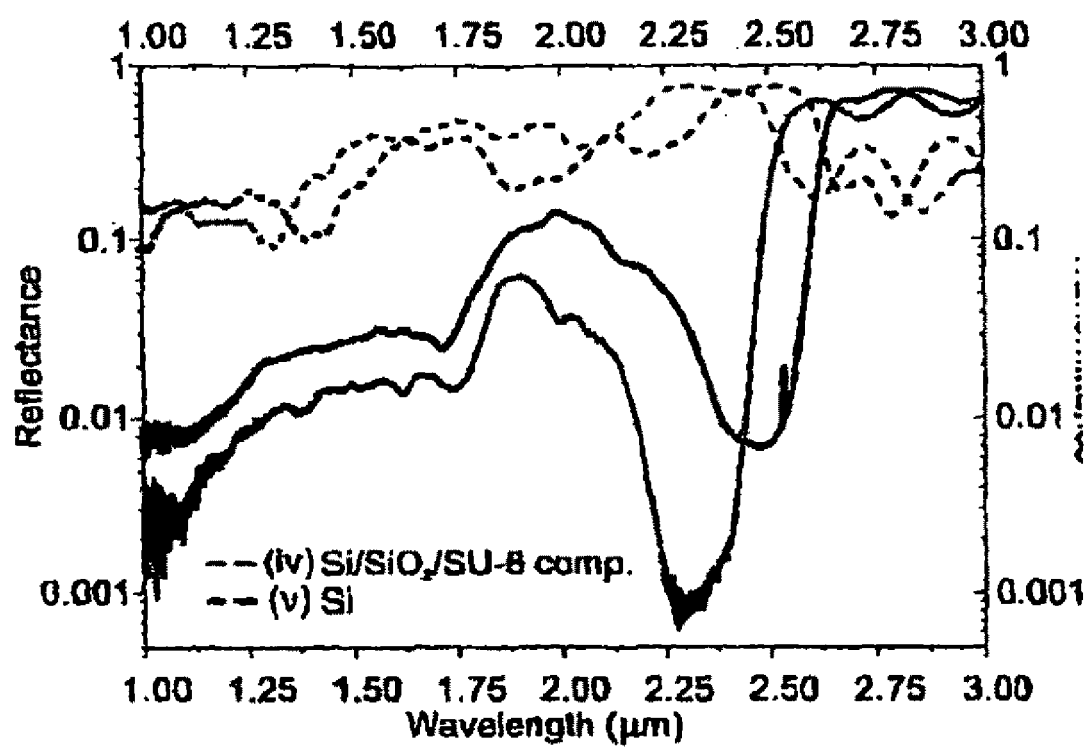
Figure 5:
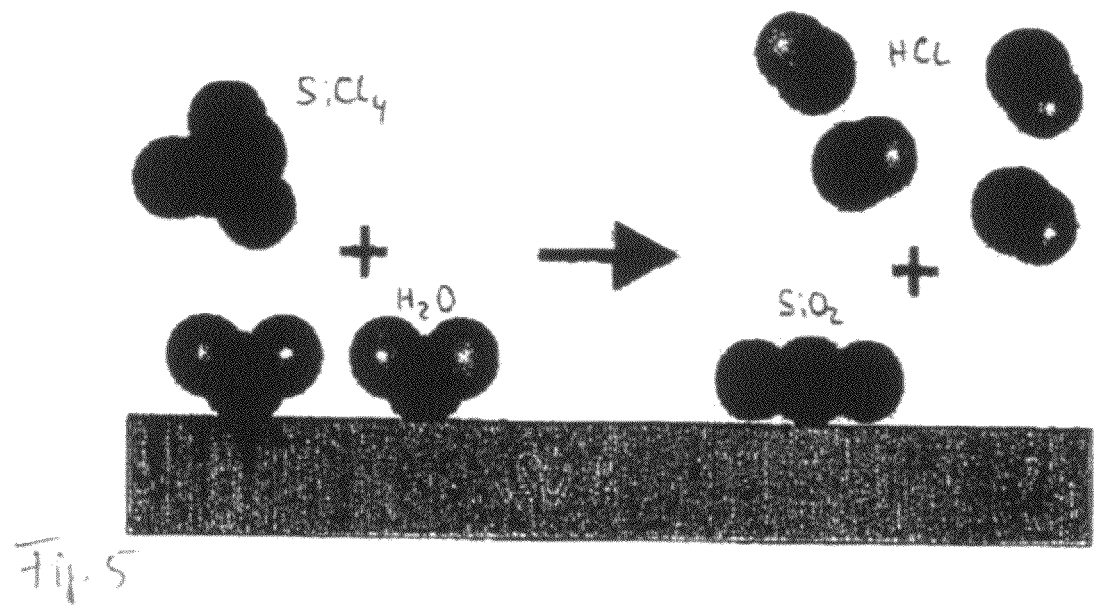
Figure 6:
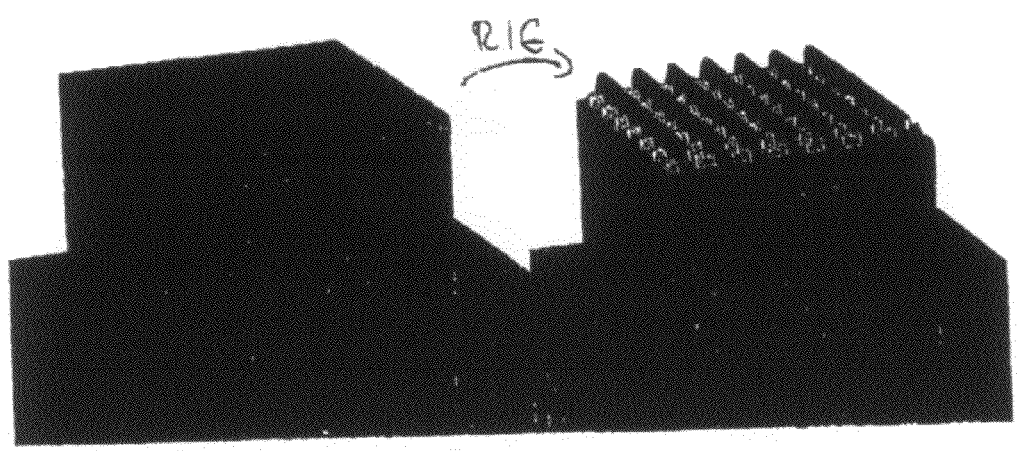

FIGS. 3 and 4:

Here, optical measurements on a photonic crystal of woodpile structure which has been silicon single-inverted by the method described are shown. The lattice constant is c=√2× 800 nm. The measurements were undertaken on a Fourier-transform infrared spectrometer (FTIR). The process described is documented visually below in the steps described in each case:

(i) The starting material is the polymeric woodpile composed of SU-8 (this is the product name of a negative photoresist from MicroChem. This resist consists of an SU-8 epoxy resin which has been dissolved in gamma-butyrolactone (GBL) and admixed with a photo acid generator composed of triarylsulfonium salt in propylene carbonate).

(ii) SU-8 woodpile coated with $SiO_2$ after 1 ALD cycle.

(iii) SU-8 woodpile coated with $SiO_2$ after 2 ALD cycles.

(iv) Si-infiltrated structure, i.e. a composite structure composed of SU-8, $SiO_2$ and Si.

(v) Si single-inverted woodpile after removal of the amorphous silicon dioxide and of the SU-8 polymer.

A full band gap at wavelength approx. 2.3 µm is obtained.

FIG. 5:

An illustration of the ALD mechanism is shown. $SiCl_4$ gas reacts with the water adsorbed on the SU-8 polymer. This forms amorphous silicon dioxide with release of hydrochloric acid.

FIG. 6:

In order to be able to remove the polymer and the silicon dioxide from the Si-infiltrated woodpile, routes are first created to the $SiO_2$ and to the shaping polymer. This is done by reactive ion etching in the inventive example.

Figure 7:
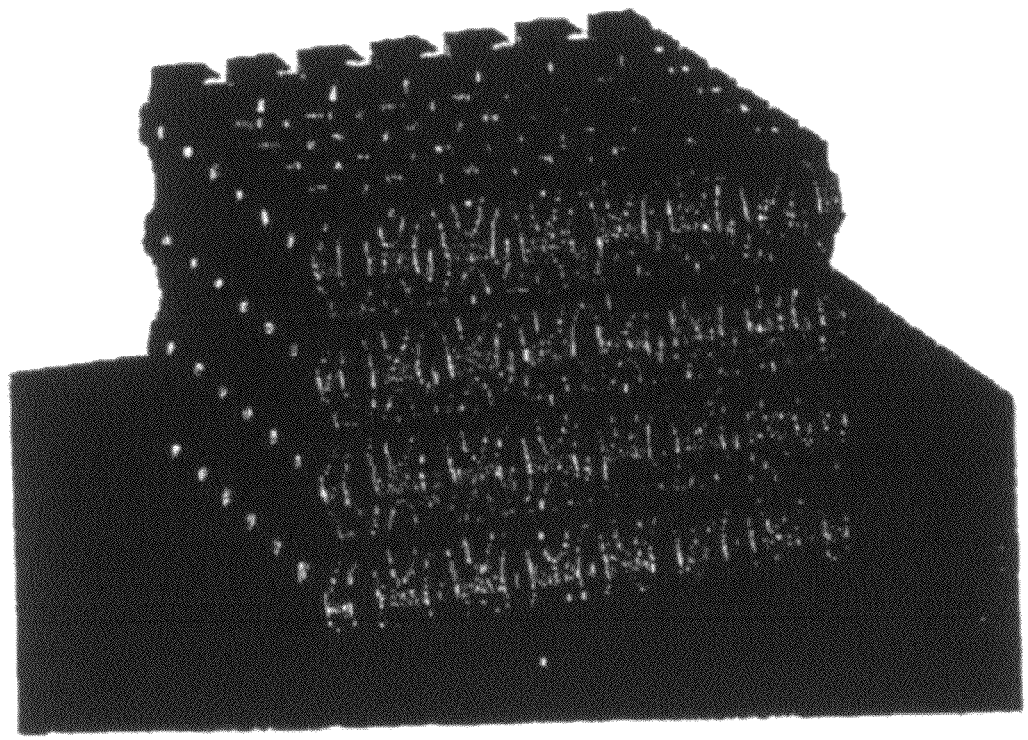

FIG. 7:

FIG. 7 shows the simulation of an Si single-inverted woodpile.

The invention claimed is:

1. A process for producing a photonic crystal which consists of a material of high refractive index or metal, comprising the following process steps:
   a) providing a polymer structure with cross-linked air pores, whose surface has empty interstitial sites,
   b) applying a homogeneous, isotropic, thin coating material to the surface of the polymer structure,
   c) introducing a high-index material,
   d) opening up a route to the polymer or to the coating material applied in step b),
   e) removing the layer applied in step b),
   f) removing the polymeric structure,
   wherein steps a-d are performed in order followed by steps e and f in any order, and wherein the process is a single inversion process.

2. The process as claimed in claim 1, wherein step f) is performed before step e).

3. The process as claimed in claim 1, wherein the isotropic, thin coating material is thermally stable and/or chemically resistant.

4. The process as claimed in claim 1, wherein, in step b), metals, oxides, nitrides, carbides or nonstoichiometric compounds composed of metals and oxides are used.

5. The process as claimed claim 1, wherein, in step as oxides b), $Al_2O_3$, MgO, $TiO_2$, $ZrO_2$, $HfO_2$ or $SiO_2$ are used as the coating material.

6. The process as claimed in claim 1, wherein the metals used are Ni, Co, Cr or W.

7. The process as claimed in claim 1, wherein the nitrides used are BN, TiN, $Si_3N_4$, $C_3N_4$ or AlN.

8. The process as claimed in claim 1, wherein the compounds composed of metals and oxides used are $ZnO_{0.99}$, $WO_{3-x}$, $TiO_{2-x}$.

9. The process as claimed claim 1, wherein the surface of the polymer structure is wetted with water and then silicon tetrachloride is applied in such an amount as to give rise to sheathing of the polymer structure with amorphous $SiO_2$.

10. The process as claimed in claim 1, wherein the high-index material applied in step c) is an Si, Ge or $Si_xGe_{1-x}$ alloy.

11. The process as claimed in claim 10, wherein disilane ($Si_2H_6$) or silane ($SiH_4$) is used for the coating.

12. The process as claimed claim 10, wherein Si is applied at a temperature of from 200 to 800° C.

13. The process as claimed in claim 10, wherein the coating is performed at a pressure of from 0.001 mbar up to several 100 mbar.

14. The process as claimed in claim 1, wherein step c) is followed by performance of reactive ion etching or plasma etching.

15. The process as claimed in claim 1, wherein the layer applied in step b) is removed by wet chemical etching.

16. The process as claimed in claim 15, wherein the layer applied in step b) is removed by means of hydrofluoric acid.

17. The process as claimed in claim 1, wherein the polymer is removed by means of thermal decomposition, by using plasmas or by wet chemical processes.

18. The process as claimed in claim 17, wherein the coated polymer structure is heated to 200-800° C.

19. The process as claimed in claim 18 with hydrogenated nanocrystalline silicon (nc-Si:H) as the material of high refractive index.

* * * * *